US006462304B2

(12) United States Patent
Kaida et al.

(10) Patent No.: US 6,462,304 B2
(45) Date of Patent: Oct. 8, 2002

(54) METHOD OF LASER-TRIMMING FOR CHIP RESISTORS

(75) Inventors: Hiroshi Kaida; Shigeru Kambara; Masato Doi, all of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 19 days.

(21) Appl. No.: 09/798,679

(22) Filed: Mar. 2, 2001

(65) Prior Publication Data

US 2001/0030178 A1 Oct. 18, 2001

Related U.S. Application Data

(60) Continuation-in-part of application No. 09/329,638, filed on Jun. 10, 1999, now abandoned, which is a division of application No. 09/119,701, filed on Jul. 21, 1998, now abandoned.

(30) Foreign Application Priority Data

Jul. 22, 1997 (JP) ............................................ 9-195704

(51) Int. Cl.[7] ................................................ B23K 26/38
(52) U.S. Cl. .................................. 219/121.69; 338/195
(58) Field of Search ....................... 219/121.68, 121.69; 338/195

(56) References Cited

U.S. PATENT DOCUMENTS 4,284,970 A * 8/1981 Berrin et al. ............... 338/195
4,429,298 A * 1/1984 Oberholzer ................. 338/195
4,563,564 A * 1/1986 Ericsen et al. .............. 338/195
5,043,694 A * 8/1991 Higashi et al. ............. 338/195
5,119,538 A * 6/1992 White et al.
5,504,470 A * 4/1996 Ginn ..................... 219/121.69
5,874,887 A * 2/1999 Kosinski ..................... 338/195
6,007,755 A * 12/1999 Hoshii et al. .......... 219/121.69
6,107,909 A * 8/2000 Kosinski ..................... 338/195

FOREIGN PATENT DOCUMENTS

CH 686985 A5 * 8/1996
JP 1-253206 A * 10/1989
JP 6-84618 A * 3/1994

* cited by examiner

*Primary Examiner*—Geoffrey S. Evans
(74) *Attorney, Agent, or Firm*—Beyer Weaver & Thomas LLP

(57) ABSTRACT

A chip resistor is formed with an elongated resistor connecting a pair of electrodes on a substrate and grooves are formed on the surface of the resistor in a characteristic pattern having a longer branch and a shorter branch. The longer branch may be L-shaped, extending between a selected point on a side edge of the resistor and an end point which is nearer towards one of the electrodes. The shorter branch extends between another point on the side edge of the resistor and an intermediate point on the longer branch other than the end point. To form the grooves in such a pattern, the longer branch is formed first by laser-trimming from the side edge of the resistor to the end point. The laser is then switched off and is moved to the intermediate branching point along the branch of the groove just formed. The shorter branch is then formed by switching on the laser and moving it from the branching point to the other end.

16 Claims, 5 Drawing Sheets

METHOD OF LASER-TRIMMING FOR CHIP RESISTORS

This is a continuation-in-part of application Ser. No. 09/329,638 filed Jun. 10, 1999, now abandoned, which is a divisional of U.S. application Ser. No. 09/119,701 filed Jul. 21, 1998, now abandoned.

BACKGROUND OF THE INVENTION

This invention relates to a method of adjusting the resistance of a chip resistor of the type for mounting to a chip by a laser-trimming process.

FIG. 5 shows a prior art chip resistor of this kind, characterized as comprising a ceramic substrate 1, a resistor 2, a pair of electrodes 3 and a glass coating layer 5. Such a chip resistor may be produced first by using a silver paste or the like to form the electrodes 3 on the ceramic substrate 1 and then by using a resistor paste or the like to form the resistor 2 so as to connect the pair of electrodes 3. After the glass coating layer 5 is formed over the resistor 2, a laser beam is used for a laser-trimming process to form a cross-sectionally wedge-shaped groove 4 in the resistor 2 through the glass coating layer 5, reaching the top surface of the ceramic substrate 1, so as to adjust the resistance value of the resistor 2. A protective layer may be formed thereafter over the glass coating layer 5.

If the groove 4 is thus formed, the resistance of the resistor 2 increases because the current which can flow therethrough is necessarily reduced. Thus, when the resistor 2 is initially formed, it is formed such that its resistance will be smaller than the desired resistance of the chip resistor to be obtained and the laser-trimming is effected so as to appropriately increase the resistance of the resistor 2 to the required target value.

Although FIG. 5 shows an example with an L-shaped groove 4, the groove 4 may be cut in other forms. FIG. 6A shows an example of a C-shaped groove 4, FIG. 6B shows another example with a J-shaped groove 4 and FIGS. 6C and 6D show still other examples with I-shaped grooves 4.

FIG. 7 shows equipotential lines 6 in the resistor 2 of FIG. 5 when a potential difference is applied across its electrodes 3. If the applied potential difference is 200V, a potential difference of about 150V will result between positions A and B on the resistor 2 shown in FIG. 7 which are on the opposite sides of the groove 4. If the gap across the groove 4 is 50 $\mu$m, the field intensity between these two points A and B is about 3000V/mm, and it is approximately equal to the voltage at which an atmospheric discharge will start. Thus, a discharge may well take place across the groove 4, depending on the condition of the glass coating layer 5 over the resistor 2. In summary, a leak current is likely to flow through such a prior art chip resistor when it is subjected to a high potential difference. In other words, prior art chip resistors are not satisfactorily resistant against high potential differences.

FIGS. 8A, 8B, 8C and 8D show equipotential lines inside the chip resistors of FIGS. 6A, 6B, 6C and 6D. When a same potential difference is applied across the pair of electrodes 3, the field intensity is about 635V/mm between positions A and B of FIG. 8A, about 3730V/mm between positions A and B of FIG. 8B, about 1570V/mm and 1590V/mm respectively between positions A and B and positions A' and B' of FIG. 8C, and about 2090V/mm and 1800V/mm respectively between positions A and B and between A' and B' of FIG. 8D. In summary, the possibility of atmospheric discharge is equally high in the case of a J-shaped groove as in the case of an L-shaped groove. The field intensity is also fairly high in the cases of I-shaped grooves.

If the groove is C-shaped, by contrast, the field intensity across the groove is relatively small. As a practical problem, however, a C-shaped groove (as shown in FIGS. 6A and 8A) is difficult to make with a satisfactorily high precision. When such a groove is cut by a laser-trimming method, the trimming is started at an edge point of the glass coating layer (not shown in FIG. 6A or 8A) to first produce an L-shaped groove, and the resistance is adjusted then to a specified target value. The direction of movement of the laser is then changed by 90 degrees, while the laser light continues to be emitted, and the groove is formed to reach the same edge of the glass coating to complete a C-shape. When it is desired to change the direction of movement of the laser after the groove has been formed in an L-shape, however, the galvanometer which is disposed inside the laser-assisted manufacturing apparatus tends to fluctuate due to inertia. As a result, the L-shaped groove tends to become longer than desired, or it is difficult to form the groove in the desired shape with a high degree of precision. This means that the resultant resistance of the chip resistor tends to be higher than the target value.

SUMMARY OF THE INVENTION

It is therefore an object of this invention in view of the above to provide a method of carrying out laser-trimming in making a chip resistor having highly accurate resistance value.

A chip resistor embodying this invention, with which the above and other objects can be accomplished, may be characterized as having grooves formed in a different pattern having a longer branch and a shorter branch, the longer branch extending between a selected point on a side edge of the resistor which is longitudinally elongated between a pair of electrodes and an end point which is longitudinally displaced from the selected point towards one of the electrodes and a shorter branch extending between another point on the side edge of the resistor and an intermediate point on the longer branch other than its end point. The longer branch, for example, may be in an L-shape with a part perpendicular to the longitudinal direction of the resistor and another part which is substantially in the longitudinal direction. To form the grooves in such a pattern, the longer branch is formed first by laser-trimming from its selected point to the end point. The laser is then switched off and is moved to the intermediate branching point. The shorter branch is then formed by switching on the laser and moving it from the branching point to the other end thereof on the same side edge of the resistor.

With a chip resistor thus formed, the area of the resistor surrounded by the longer and shorter branches of the grooves is not affected by the potential difference applied across the electrodes. As a result, the distance between the high-potential area and the low-potential area of the resistor is effectively increased and the likelihood of a leak current is reduced. With a method of laser-trimming according to this invention, the dimensions of the grooves can be controlled more dependably and accurately.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, corresponding or like components are indicated by the same numerals and may not necessarily be explained repetitiously.

DETAILED DESCRIPTION OF THE INVENTION

Figure 1A:
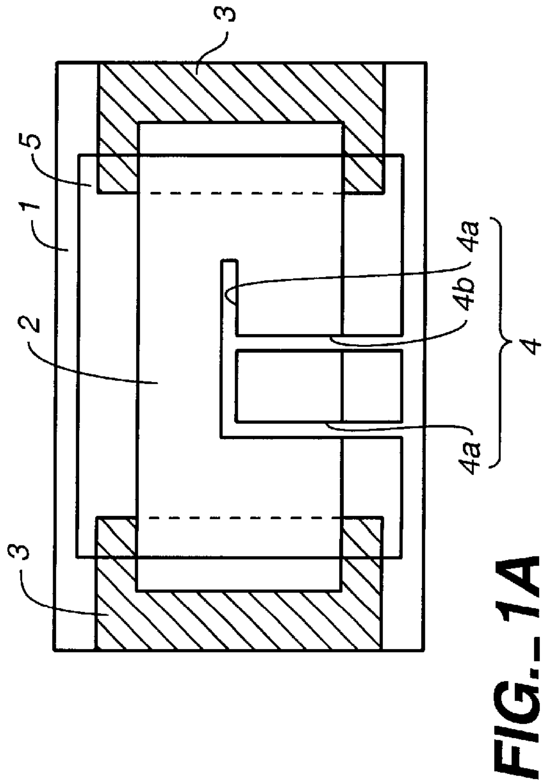
FIGS. 1A, 1B, 1C and 1D are each a plan view of a chip resistor embodying this invention.

FIGS. 1A, 1B, 1C and 1D each show a chip resistor embodying this invention. Since they are similar not only among themselves but also to the prior art chip resistor described above with reference to FIG. 5, like components such as the ceramic substrate 1, the rectangular resistor 2, the pair of electrodes 3 and the glass coating layer 5 are indicated by the same numerals as used in FIG. 5 and are not described repetitiously. For the convenience of description, the direction, in which a current will generally flow through the rectangular resistor 2 when a potential difference is applied across the pair of electrodes 3 and in which the resistor 2 connecting the electrodes 3 together is generally elongated, will be herein referred to as "the longitudinal direction" of the resistor 2.

The chip resistors embodying this invention and shown in FIGS. 1A, 1B, 1C and 1D are different from the prior art chip resistor of FIGS. 5, 6A, 6B, 6C and 6D in that grooves 4 formed in the resistor 2 through the glass coating layer 5, reaching the ceramic substrate 1, have a different pattern with branches joined at "a branching point." There is a longer branch 4*a* extending from one edge point of the glass coating layer 5, passing over a longitudinally extending side edge of the resistor 2, to an end point which is longitudinally displaced from the crossing point at which the side edge of the resistor 2 is crossed. A shorter branch 4*b* is formed, extending from another edge point of the glass coating layer 5, passing over the same side edge of the resistor 2 as does the longer branch 4*a* but at a longitudinally displaced different position, and ending at an intermediate point (or "the branching point") on the longer branch 4*a* other than its end point.

Figure 1B:
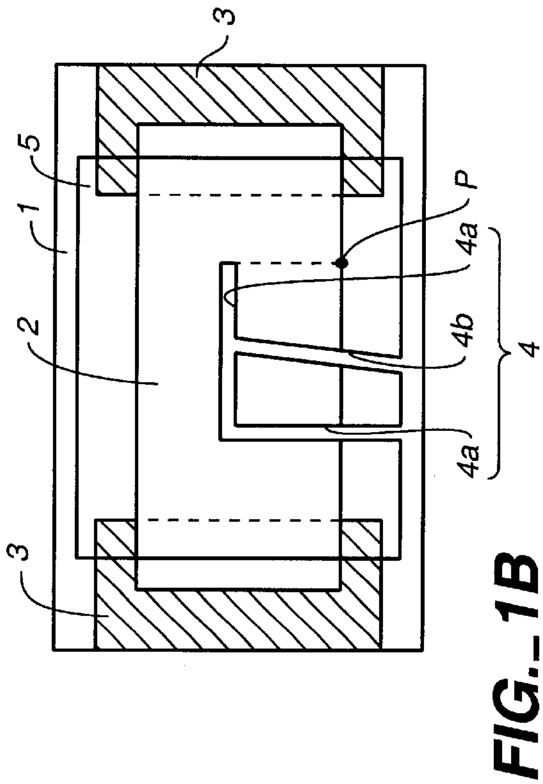
Figure 1C:
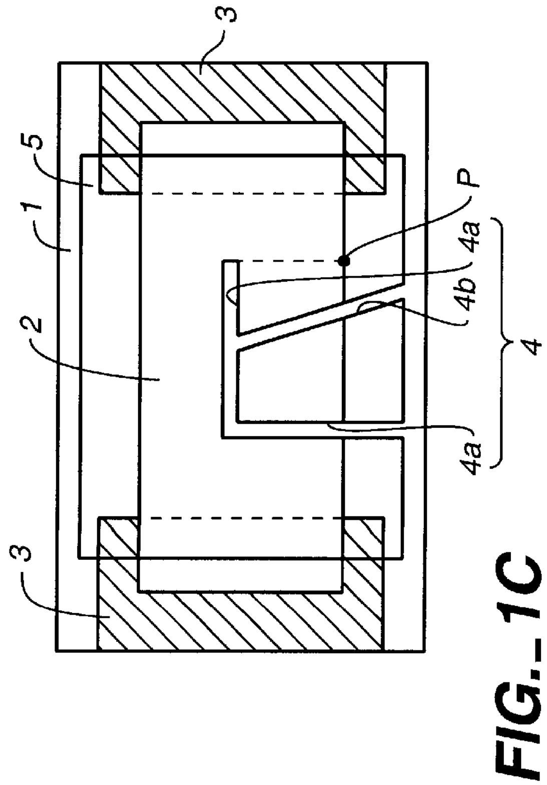

The first, second and third embodiments shown in FIGS. 1A, 1B and 1C are characterized wherein the longer branch 4*a* of the grooves 4 is L-shaped, having a perpendicular part and a longitudinal part which are both substantially straight and linear. The perpendicular part extends from an edge point of the glass coating layer 5 substantially perpendicularly to the aforementioned longitudinal direction, passing a side edge of the resistor 2 and reaching a point nearly in the middle of the resistor 2 in the direction of its width (perpendicular to its longitudinal direction). The longitudinal part extends longitudinally from the end point of the perpendicular part of the longer branch 4*a* such that an L-shape is formed together with the perpendicular part.

According to the first embodiment of the invention, shown in FIG. 1A, the shorter branch 4*b* is formed parallel to the perpendicular part of the longer branch 4*a*, extending between an edge point of the glass coating layer 5, passing over the same side edge of the resistor 2 as does the longer branch 4*a* and ending at an intermediate point (or "the branching point") on the longitudinal part of the longer branch 4*a* approximately at its middle.

The second and third embodiments of the invention, shown respectively in FIGS. 1B and 1C, are similar to the first embodiment except the shorter branch 4*b* is straight but not parallel to the perpendicular part of the longer branch 4*a*. According to the second embodiment, the separation in the longitudinal direction between the perpendicular part of the longer branch 4*a* and the shorter branch 4*b* decreases as one moves away from the branching point, at which the two branches 4*a* and 4*b* of the grooves 4 meet, towards the side edge of the resistor 2. According to the third embodiment, this separation increases as one moves similarly from the branching point towards the side edge of the resistor 2. It is to be noted, however, that the separation in the longitudinal direction between the perpendicular part of the longer branch 4*a* and the shorter branch 4*b*, along the side edge of the resistor 2 crossed by them, is less than the length of the longitudinal part of the longer branch 4*a*. Explained in another way, the point (indicated by letter P in FIGS. 1B and 1C) on the side edge which will be crossed by a line drawn perpendicularly from the end point of the longitudinal part of the longer branch 4*a* should be on the opposite side of the shorter branch 4*b* from the perpendicular part of the longer branch 4*a*.

Figure 1D:
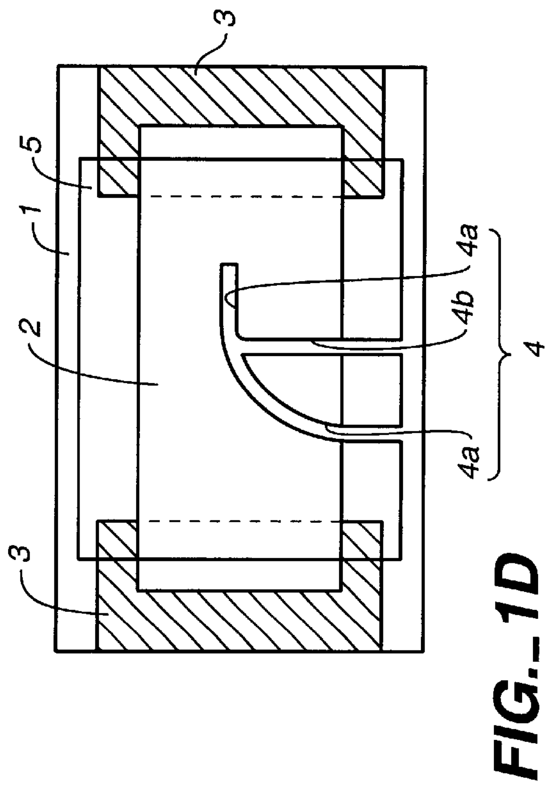

The fourth embodiment of the invention shown in FIG. 1D is characterized wherein the longer branch 4*a* of the grooves 4 is not L-shaped but is curved, extending from an edge point of the glass coating layer 5, passing over a side edge of the resistor 2 (at "the crossing point"), to an end point which is displaced longitudinally from the aforementioned crossing point. The shorter branch 4*b* is straight, substantially perpendicular to the longitudinal direction, extending from another edge point of the glass coating layer 5 and reaching an intermediate point on the longer branch 4*a* away from its end point.

Figure 2:
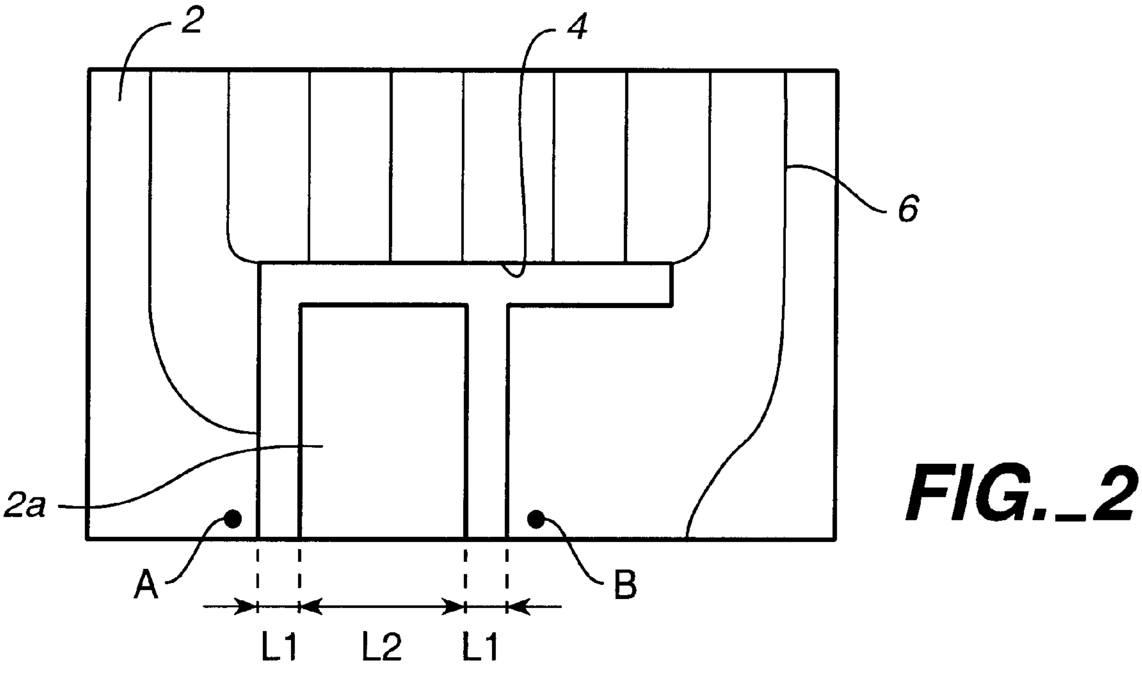
FIG. 2 shows equipotential lines inside the resistor of FIG. 1A when a potential difference has been applied to its electrodes.

FIG. 2 shows equipotential lines inside the resistor 2 of the chip resistor according to the first embodiment of the invention shown above in FIG. 1A when a potential difference has been applied across its electrodes 3. Since the application of the potential difference does not affect the area 2*a* completely surrounded by the grooves 4, it is between points A and B indicated in FIG. 2 on opposite sides of the grooves 4 that a high potential difference appears as a load. Let us assume that the load potential difference between points A and B is about 150V, that the width L1 of the grooves 4 is 50 μm and that the width L2 of the area 2*a* surrounded by the grooves 4 is 160 μm. In such a realistic situation, the voltage per unit charge (or the electric field intensity) between points A and B is about 577V/mm. Since this field intensity is sufficiently smaller than the threshold field intensity of 3000V/mm for starting a discharge in air, there is no danger of occurrence of a discharge with this chip resistor and this means that an even higher potential difference can be applied.

Figure 3:
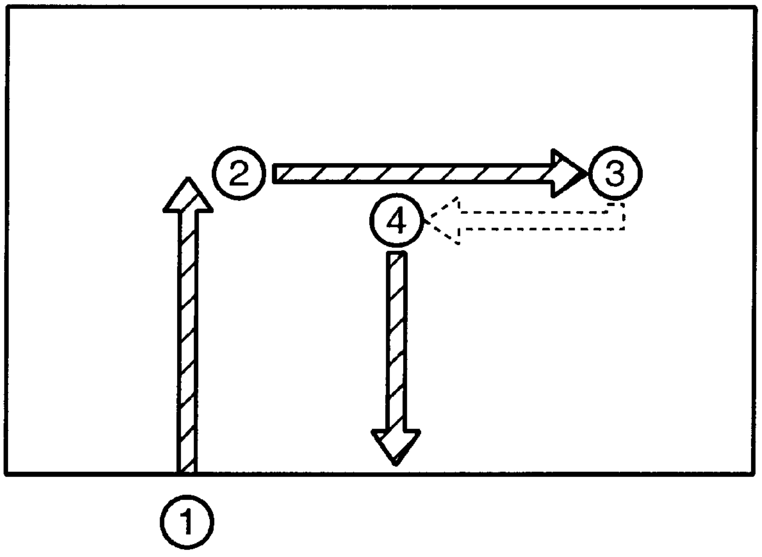
FIG. 3 is a drawing for showing the sequence of steps in the laser-trimming according to this invention.

Next, the method of carrying out laser-trimming according to this invention will be described with reference to FIG. 3. To produce the grooves 4 of the chip resistor shown in FIG. 1A, the laser-trimming is started from the edge point (indicated by circled numeral 1 in FIG. 3) of the glass coating layer 5 (as shown in FIG. 1A) at one end of the longer branch 4*a* and the laser (or the focal point of the beam therefrom) is kept moving perpendicularly to the longitudinal direction to form the perpendicular part of the longer branch 4*a*. After reaching the corner point (indicated by circled numeral 2) of the L-shaped longer branch 4*a*, the laser is moved in the longitudinal direction until it reaches the end point (indicated by circled numeral 3) of the longer branch 4*a*. The length of the longitudinal part of the longer branch 4*a* is adjusted such that the resistor 2 has the resistance value desired for the chip resistor. It is to be noted in the description above, as well as in the description to follow, that the word "laser" is herein frequently used as indicating the position of its focal point where the laser beam therefrom converges. Thus, wherever it is said that the "laser" is moved from one position on the surface of the resistor 2 to another, it is to be understood that the laser beam-emitting apparatus is operated such that its focal point moves as described in the sentence. The focal point of the laser when the laser is shut off is intended to be understood as the point where the beam therefrom would converge if the laser were then switched on.

The laser emission is stopped when the longer part 4*a* of the grooves 4 has thus been completed, and the galvanometer (not shown, or the focal point of the beam from the laser) is returned in the longitudinal direction as indicated by a broken arrow. When it reaches the aforementioned branching point (indicated by circled numeral 4) between the longer and shorter branches 4*a* and 4*b*, the laser is switched on again and the trimming is effected perpendicularly to the longitudinal direction, as indicated by the downwardly pointing arrow shown in FIG. 3.

Figure 4:
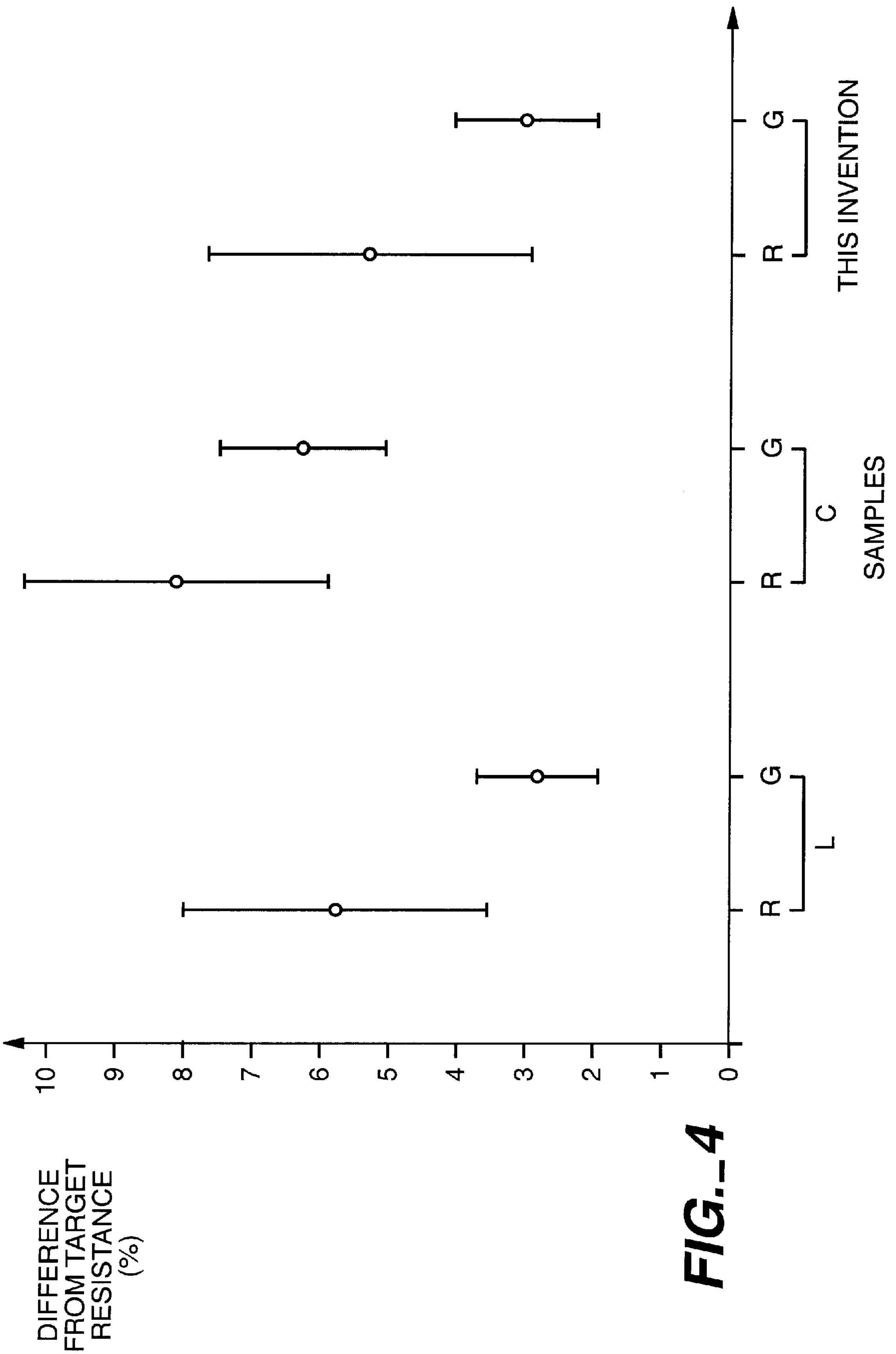
FIG. 4 is a graph for showing the distributions of differences between measured and target resistance values for prior art resistors and resistors embodying this invention.

The method of laser-trimming according to this invention is advantageous in that the laser can be aimed more accurately and the grooves can be formed more accurately, say, than in the production of prior art C-shaped grooves described above. FIG. 4 compares the distributions (averages and deviations) of the differences between measured and target resistance values between prior art chip resistor samples with L-shaped and C-shaped grooves and samples embodying this invention. For each shape of the grooves, thirty samples were tested. The target resistance was 900 kΩ. Symbols R indicate samples obtained by carrying out the laser-trimming after the resistor 2 has been formed and symbols G indicate those obtained by carrying out the laser-trimming after the glass coating layer 5 has been formed over the resistor 2. Resistance values were measured for all these samples, the difference of each from the target resistance value was calculated, and their averages and deviations are shown in FIG. 4.

FIG. 4 shows clearly that the differences from the target value (their average as well as the deviations) for samples embodying this invention are about the same as for those with an L-shaped groove and much better than those with a C-shaped groove produced by the prior art method.

The invention has been described above with reference to only a limited number of examples, but these examples are not intended to limit the scope of the invention. Many modifications and variations are possible within the scope of the invention. For example, the laser-trimming need not be carried out after the glass coating layer 5 is formed on the surface of the resistor 2. Alternatively, the laser-trimming according to this invention may be carried out directly on the resistor 2 without forming the glass coating layer 5. As for the pattern of the grooves 4, FIGS. 1A, 1B, 1C and 1D are not intended to limit the scope of the invention. Neither the longer part nor the shorter part of the grooves 4 is required to be straight or exactly perpendicular to the longitudinal direction. The longer part 4*a* may even be straight and oblique to the longitudinal direction although it is preferable, from the point of view of accuracy in adjusting the resistance value, that it be longitudinally oriented near the end point.

Figure 5:
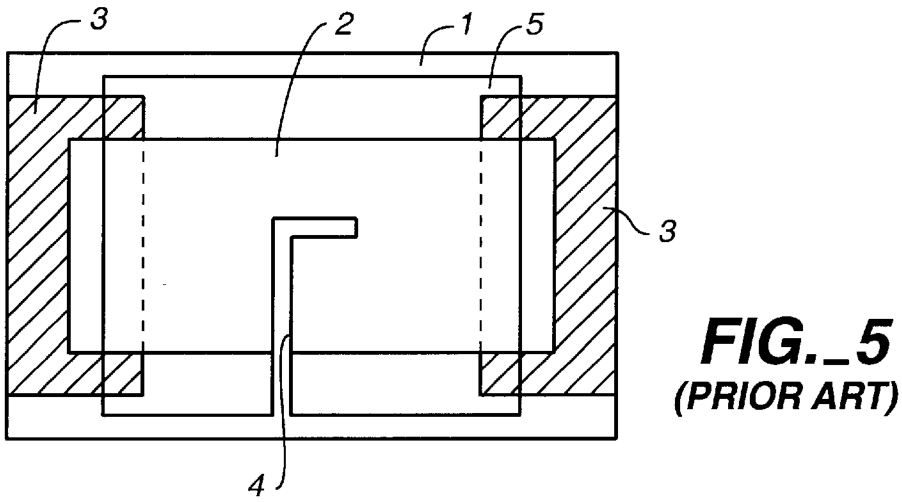
FIG. 5 (PRIOR ART)
FIG. 5 is a schematic plan view of a prior art chip resistor.
Figure 6A:
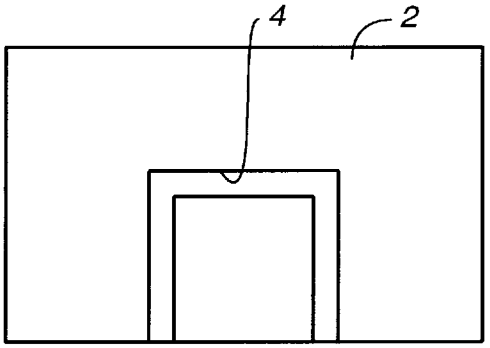
FIG. 6A (PRIOR ART)
FIGS. 6A, 6B, 6C and 6D are schematic plan views of other prior art chip resistors.
Figure 6B:
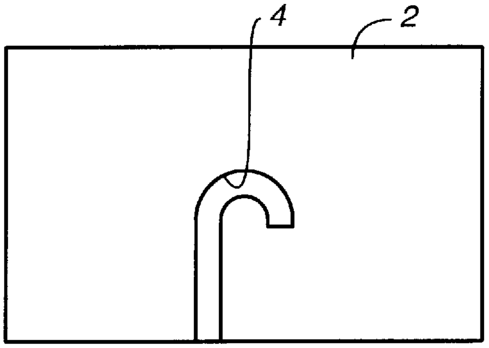
FIG. 6B (PRIOR ART)
Figure 6C:
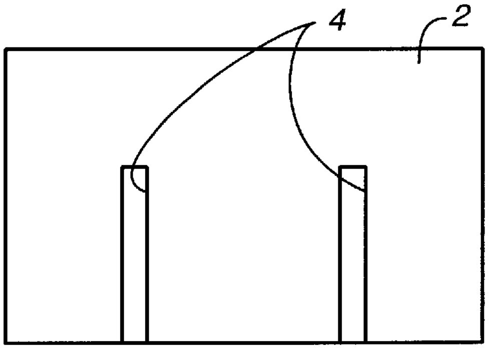
FIG. 6C (PRIOR ART)
Figure 6D:
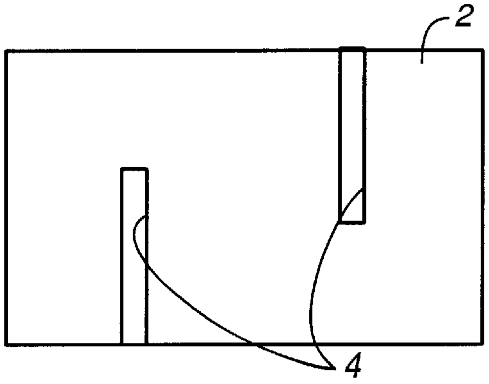
FIG. 6D (PRIOR ART)
Figure 7:
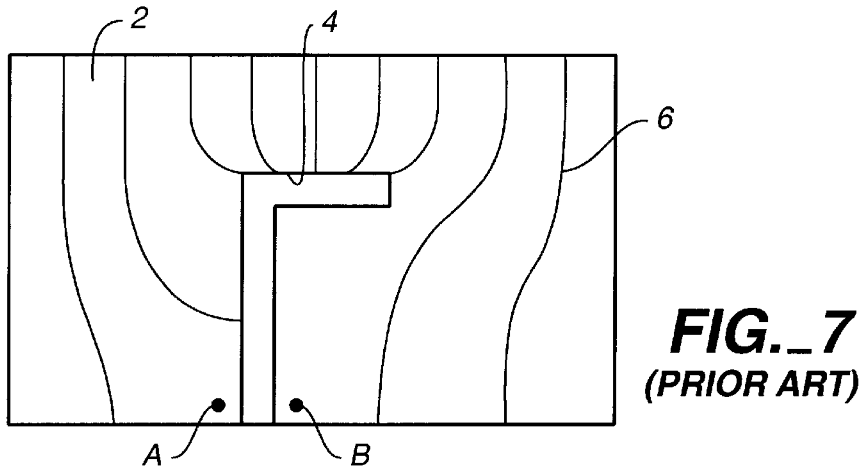
FIG. 7 (PRIOR ART)
FIG. 7 shows equipotential lines inside the chip resistor of FIG. 5.
Figure 8A:
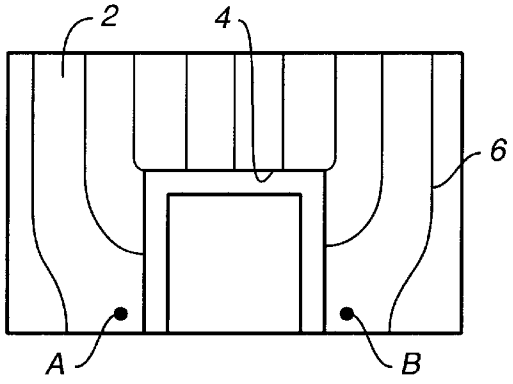
FIG. 8A (PRIOR ART)
FIGS. 8A, 8B, 8C and 8D show equipotential lines inside the resistors of FIGS. 6A, 6B, 6C and 6D.
Figure 8B:
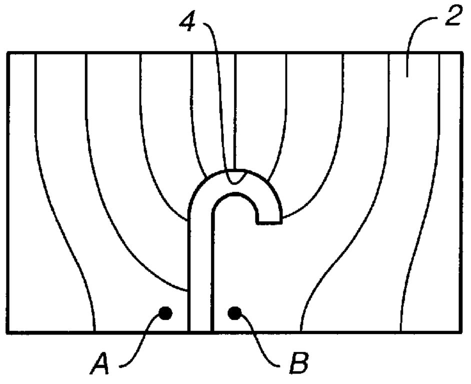
FIG. 8B (PRIOR ART)
Figure 8C:
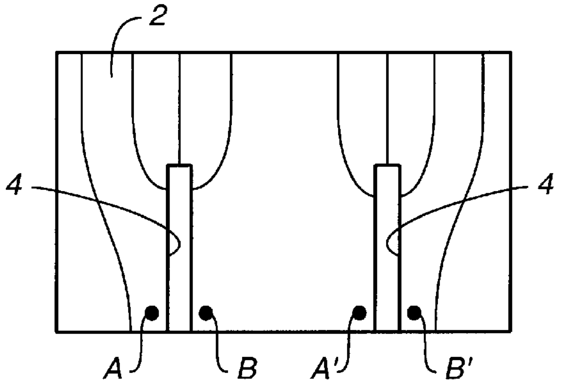
FIG. 8C (PRIOR ART)
Figure 8D:
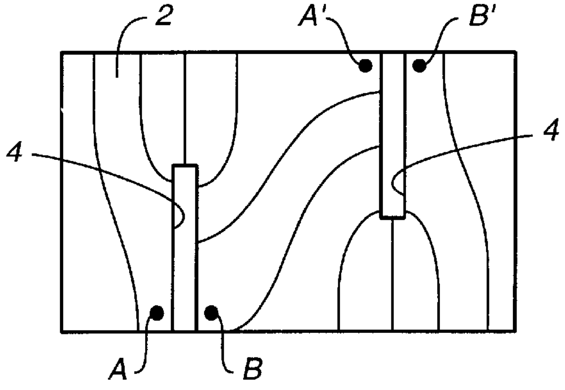
FIG. 8D (PRIOR ART)

In summary, chip resistors according to this invention do not easily generate a leak current due to an atmospheric discharge because no large load potential difference is generated over a very short distance (as was the case with prior art resistors with an L-shaped groove as shown in FIG. 5). Moreover, dimensionally accurate grooves can be produced according to the method of this invention, as compared to the prior art resistors with a C-shaped groove.

What is claimed is:

1. A method of laser-trimming a resistor of a chip resistor to form grooves thereon, said resistor being covered with a protective layer and elongated in a longitudinal direction between and connected to a pair of electrodes on a substrate, said method comprising the steps of:

- forming a longer linear branch of said grooves through said protective layer by moving a laser beam from a laser from a selected point on a side edge of said resistor to an end point which is longitudinally closer to one of said electrodes than said selected point is, said laser having a focal point;
- switching off said laser at said end point;
- causing said focal point of the switched-off laser to move back along said longer linear branch to an intermediate branching point which is on said longer linear branch; and
- switching on said laser and forming a shorter linear branch of said grooves through said protective layer by moving the focal point of said laser beam from said intermediate branching point to another point on said side edge which is longitudinally closer to said one electrode than is said selected point.

2. The method of claim 1 wherein said longer branch of said groove is L-shaped, having a perpendicular part which is straight and extends substantially perpendicularly to said longitudinal direction between said selected point and a corner point, and a longitudinal part which is straight and extends substantially parallel to said longitudinal direction between said end point and said corner point.

3. The method of claim 2 wherein said shorter branch is substantially perpendicular to said longitudinal direction and connects to said longitudinal part at a branching point which is approximately at the middle of said longitudinal part.

4. The method of claim 3 wherein the step of forming said longer linear branch includes the step of thereby adjusting resistance of said resistor.

5. The method of claim 4 wherein said protective layer comprises a glass coating layer.

6. The method of claim 3 wherein said protective layer comprises a glass coating layer.

7. The method of claim 2 wherein the step of forming said longer linear branch includes the step of thereby adjusting resistance of said resistor.

8. The method of claim 7 wherein said protective layer comprises a glass coating layer.

9. The method of claim 2 wherein said protective layer comprises a glass coating layer.

10. The method of claim 1 wherein no part of said shorter branch is closer in said longitudinal direction to said one electrode than is said end point.

11. The method of claim 10 wherein the step of forming said longer linear branch includes the step of thereby adjusting resistance of said resistor.

12. The method of claim 11 wherein said protective layer comprises a glass coating layer.

13. The method of claim 10 wherein said protective layer comprises a glass coating layer.

14. The method of claim 1 wherein the step of forming said longer linear branch includes the step of thereby adjusting resistance of said resistor.

15. The method of claim 14 wherein said protective layer comprises a glass coating layer.

16. The method of claim 1 wherein said protective layer comprises a glass coating layer.

* * * * *